United States Patent [19]

Kim

[11] Patent Number: 5,534,936
[45] Date of Patent: Jul. 9, 1996

[54] APPARATUS FOR REDUCING FLICKERS OF ENCODER WHEN DIGITALLY CONVERTING VIDEO SIGNALS FROM NON-INTERLACED TO INTERLACED FORMAT

[75] Inventor: Hae Jong Kim, Seoul, Rep. of Korea

[73] Assignee: Goldstar Co., Ltd., Seoul, Rep. of Korea

[21] Appl. No.: 390,576

[22] Filed: Feb. 17, 1995

[30] Foreign Application Priority Data

Feb. 17, 1994 [KR] Rep. of Korea .................... 2810/1994

[51] Int. Cl.$^6$ .................................................. H04N 7/01
[52] U.S. Cl. ...................... 348/448; 348/458; 348/910
[58] Field of Search ............................... 348/910, 448, 348/458, 447; H04N 7/01

[56] References Cited

U.S. PATENT DOCUMENTS

| | | | |
|---|---|---|---|
| 4,455,572 | 1/1984 | Malden | 348/910 |
| 4,720,745 | 1/1988 | Deforest et al. | 348/448 |
| 5,182,643 | 1/1993 | Futscher | 348/447 |

FOREIGN PATENT DOCUMENTS

| | | | |
|---|---|---|---|
| 0032681 | 2/1986 | Japan | H04N 7/010 |

Primary Examiner—Victor R. Kostak
Assistant Examiner—Juan G. Acosta

[57] ABSTRACT

An improved apparatus for reducing flickers of an encoder capable of advantageously reducing flickers occurred when video signals are converted from a non-interlace scanning method to an interlace scanning method in the digital method, which includes a graphic controller for outputting a pixel signal by a line unit and for outputting a pixel clock, a horizontal synchronous signal and a vertical synchronous signal; a synchronous signal converter for converting a pixel clock, a horizontal synchronous signal and a vertical synchronous signal outputted from the graphic controller to a pixel clock, a horizontal synchronous signal and a vertical synchronous signal of an interlace scanning method; a control signal generator for outputting a control signal by receiving a pixel clock, a horizontal synchronous signal and a vertical synchronous signal of an interlace scanning method outputted from the synchronous signal converter; a line store unit for selecting a pixel data corresponding to nth even scanning line among the output signals of the graphic controller and for writing/reading the selected pixel data in accordance with a control signal of the control signal generator; a multiplexer for selecting and outputting a pixel data of a scanning line adjacent thereto among the output signals of the line store unit; a digital added for adding a pixel data of a scanning line adjacent thereto outputted from the multiplexer; a shifting unit for computing average value of pixel data at a scanning line adjacent thereto by receiving an output signal of the digital adder; an encoder for encoding a signal outputted from the shifting unit; and an oscillator for transmitting clocks to the control signal generator and the shifting unit.

8 Claims, 4 Drawing Sheets

FIG.8(C) CNT  11    00    01    10    00    01    10    00

FIG.8(D) FIFO Write   Fc,Fa   Fb,Fc   Fa,Fb   Fc,Fa   Fb,Fc   Fa,Fb   Fc,Fa

FIG.8(E) FIFO Read    Fb,Fc   Fa,Fb   Fc,Fa   Fb,Fc   Fa,Fb   Fc,Fa   Fb,Fc

FIG.8(F) FIFO Reset   Fb,Fc   Fa,Fb   Fc,Fa   Fb,Fc   Fa,Fb   Fc,Fa

| FIG.8(G) | | | | | | | |
|---|---|---|---|---|---|---|---|
| Fa | I0Write | | I2Write | I3Write | | I5Write | I6Write |
| Fb | | I1Write | I2Write | | I4Write | I5Write | |
| Fc | I0Write | I1Write | | I3Write | I4Write | | I6Write |

| FIG.8(H) | | | | | | | |
|---|---|---|---|---|---|---|---|
| Fa | | I0Read | I2Read | | I3Read | I5Read | |
| Fb | | I1Read | | I2Read | I4Read | | I5Read |
| Fc | | | I1Read | I3Read | | I4Read | I6Read |

FIG.8(I)
MPP    MPP:I0   MPP:I1   MPP:I2   MPP:I3   MPP:I4   MPP:I5
MCP    MPP:I1   MPP:I2   MPP:I3   MPP:I4   MPP:I5   MPP:I6

APPARATUS FOR REDUCING FLICKERS OF ENCODER WHEN DIGITALLY CONVERTING VIDEO SIGNALS FROM NON-INTERLACED TO INTERLACED FORMAT

BACKGROUND OF THE INVENTION

1. Field of the Invention

The present invention relates to an apparatus for reducing flickers of an encoder, and particularly to an improved apparatus for reducing flickers of an encoder capable of advantageously reducing flickers occurred when video signals are convened digitally from a non-interlace scanning method to an interlace scanning method.

2. Description of the Conventional Art

Conventionally, the flickers occur in the video signals outputted from an encoder when the video signals convened from the non-interlace scanning method to the interlace scanning method are encoded at an RGB encoder. Thus, since the video signals are usually scanned 60 times per second in the non-interlace scanning method and divided into the even field and the odd field in the interlace scanning method by being scanned 30 times per second, the flickers are shown therein as an elastic line swinging up and down, which increase when the brightness differences adjacent colors at the flame of the non-interlace scanning before encoding is increased.

In an attempt to reduce such flickers, an analog method of reducing the brightness difference in adjacent colors is used. The conventional apparatus for reducing flickers using such a method, referring to FIG. 1 includes a graphic controller 1 for outputting a pixel signal of a scanning line unit when the video signal of the non-interlace scanning method is inputted thereto, a line store 2 for storing a pixel signal of nth odd scanning signal among pixel signals of a scanning line unit outputted from the graphic controller 1, a line store 3 for storing a pixel signal of nth even scanning line among pixel signals of a scanning line unit outputted from the graphic controller 1, digital/analog converters(DAC) 4 and 5 for converting the pixel signals of the nth odd and even scanning lines outputted from the line stores 2 and 3, an analog adder 6 for adding the pixel signal of the adjacent scanning line from the digital/analog converters 4 and 5, a divider 7 for computing an average value by dividing the output signal of the analog adder 6 by two, and an encoder 8 for finally outputting the video signal of NTSC or PAL method of the interlace scanning method by encoding the output signal of the divider 7.

The operation of the conventional apparatus for reducing the flickers of an encoder will now be explained.

To begin with, the graphic controller 1 outputs the pixel signal of the scanning line unit from the video signals of the interlace scanning method inputted thereto. Thereafter, the line stores 2 and 3 each store the pixel signals corresponding to the nth odd and even scanning lines among pixel signals of the scanning line unit outputted from the graphic controller 1. The digital/analog converters 4 and 5 convert the pixel signals of the nth odd and even scanning lines outputted from the line stores 2 and 3 to the digital/analog signals and output the converted signals to the analog adder 6. The analog adder 6 adds the pixel signal of the adjacent scanning line outputted from the digital/analog converters and outputs the added signals to the divider 7. The divider 7 computes the average value by dividing the signals added by the pixel signal of the adjacent scanning line by two at the analog adder 6 and outputs these signals that have converted from the video signal of the non-interlace scanning method to the video signals of the interlace scanning method, now taking the form of the obtained average value. Thereafter, the analog encoder 8 encodes the signals outputted from the divider 7 and outputs the video signals of the NTSC or PAL of the interlace scanning method by encoding the signals outputted from the divider.

However, the conventional apparatus for reducing flickers of an encoder has problems in enhancing the resolution quality thereof because the video signals are processed in a state of analog, in addition to that, the external noise may be mixed thereinto.

SUMMARY OF THE INVENTION

Accordingly, it is an object of the present invention to provide an apparatus for reducing flickers of an encoder.

It is another object of the present invention to provide an improved apparatus for reducing flickers of an encoder capable of advantageously reducing flickers occurred when video signals are converted from a non-interlace scanning method to an interlace scanning method via a digital method.

To achieve the above objects, there is provided an apparatus for reducing flickers of an encoder, which includes a graphic controller for outputting a pixel signal by a line unit and for outputting a pixel clock, a horizontal synchronous signal and a vertical synchronous signal; a synchronous signal converter for converting a pixel clock, a horizontal synchronous signal and a vertical synchronous signal outputted from the graphic controller to a pixel clock, a horizontal synchronous signal and a vertical synchronous signal of an interlace scanning method; a control signal generator for outputting a control signal by receiving a pixel clock, a horizontal synchronous signal and a vertical synchronous signal of an interlace scanning method outputted from the synchronous signal converter; a line store unit for selecting a pixel data corresponding to nth even scanning line among the output signals of the graphic controller and for writing/reading the selected pixel data in accordance with a control signal of the control signal generator; a multiplexer for selecting and outputting a pixel data of a scanning line adjacent thereto among the output signals of the line store unit; a digital adder for adding pixel data of a scanning line adjacent thereto outputted from the multiplexer; a shifting unit for computing average value of pixel data at a scanning line adjacent thereto by receiving an output signal of the digital adder; an encoder for encoding a signal outputted from the shifting unit; and an oscillator for transmitting clock signals to the control signal generator and the shifting unit.

BRIEF DESCRIPTION OF THE DRAWINGS

FIG. 8A to 8I are views showing an operation of the line store unit and the multiplexer of FIG. 2.

DETAILED DESCRIPTION OF THE INVENTION

Figure 1:
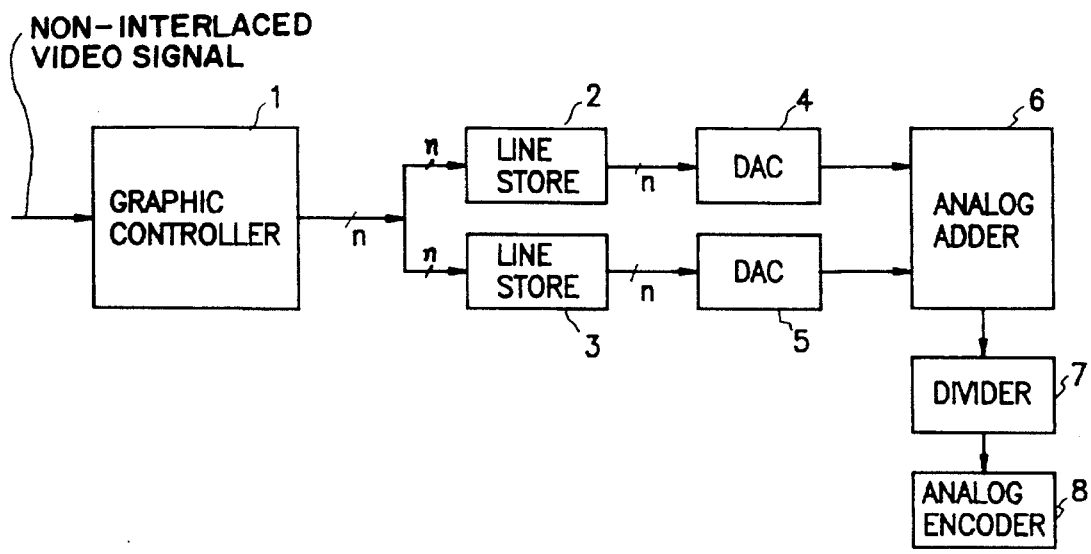
FIG. 1 is a block diagram showing a construction of a conventional apparatus for reducing flickers of an encoder.
Figure 2:
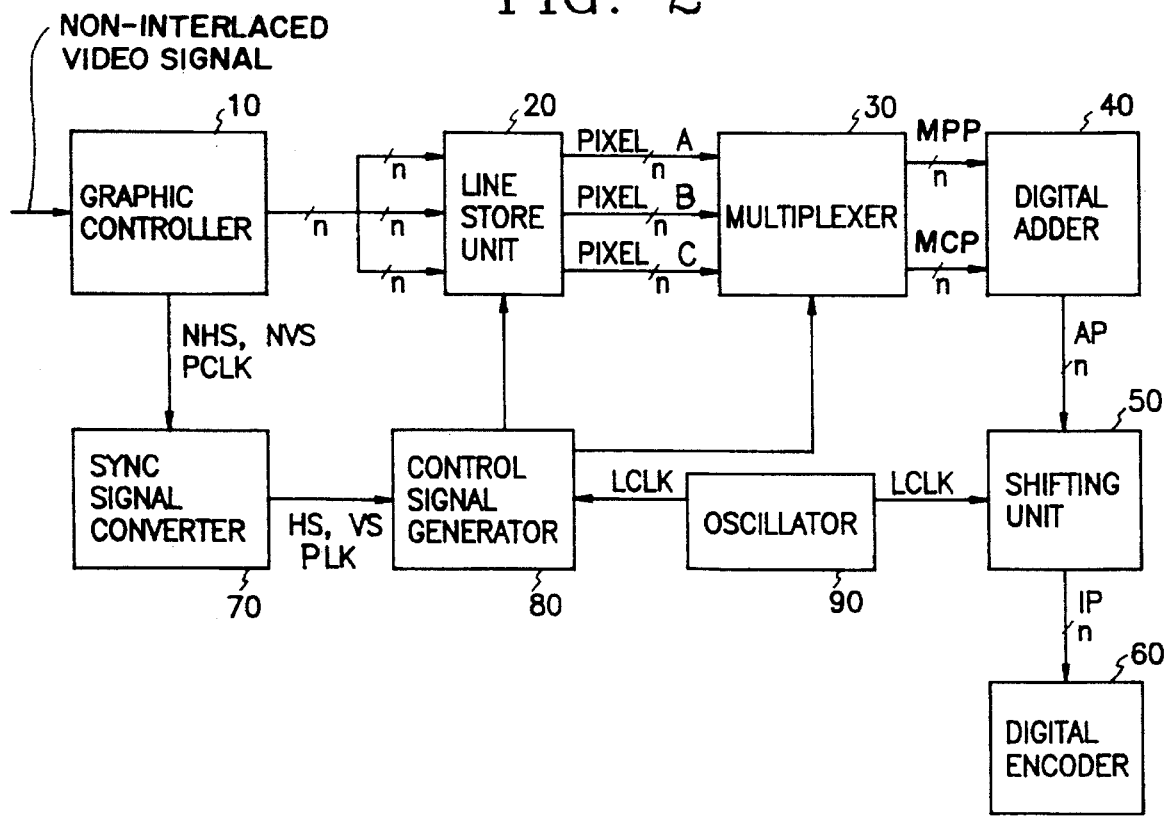
FIG. 2 is a block diagram showing a construction of an apparatus for reducing flickers of an encoder according to the present invention.

An apparatus for reducing flickers of an encoder according to the present invention, referring to FIG. 2, includes a graphic controller 10 for outputting a pixel signal of a scanning line unit and for generating a horizontal synchronous signal NHS a vertical synchronous signal NVS, and a pixel clock PCLK in accordance with an inputted video signal of a non-interlace scanning method, a store unit 20 consisting of a plurality of FIFO memory for selecting/ storing a pixel data of an nth even scanning line among output signals of the graphic controller 10, a multiplexer 30 for selecting two signals among output signals PIXEL A, PIXEL B, and PIXEL C of the line store unit 20, a digital adder 40 for adding the output signals MPP (multiplexed previous pixel) and MCP of (multiplexed current pixel) the multiplexer 30, a shifting unit 50 for computing an average value from the output signals of the digital adder 40, a digital encoder 60 for encoding the output signals of the shifting unit 50, a synchronous signal converter 70 for converting a horizontal, vertical synchronous signals, pixel clocks NHS, (NVS, PCLK) of a non-interlace scanning method of the output signals of the graphic controller 10 to a horizontal, vertical synchronous signals, pixel clocks (HS, VS, PLK) of an interlace scanning method, a control signal generator 80 for controlling the line store unit 20 and the multiplexer 30 in accordance with an output signal of the synchronous signal converter 70, and an oscillator 90 for applying a predetermined clock pulse to the control signal generator 80 and the shifting unit 50.

The operation of the apparatus for reducing flickers of the encoder according to the present invention will now be explained.

The graphic controller 10 outputs the video signals, of the non-interlace scanning method inputted thereto, to the line store unit by making it the pixel signals of the scanning line unit. In addition, the graphic controller 10 outputs the horizontal synchronous signal NHS, the vertical synchronous signal NVS, and the pixel clock PCLK of the video signals of the non-interlace scanning method to the synchronous signal converter 70.

Figure 3:
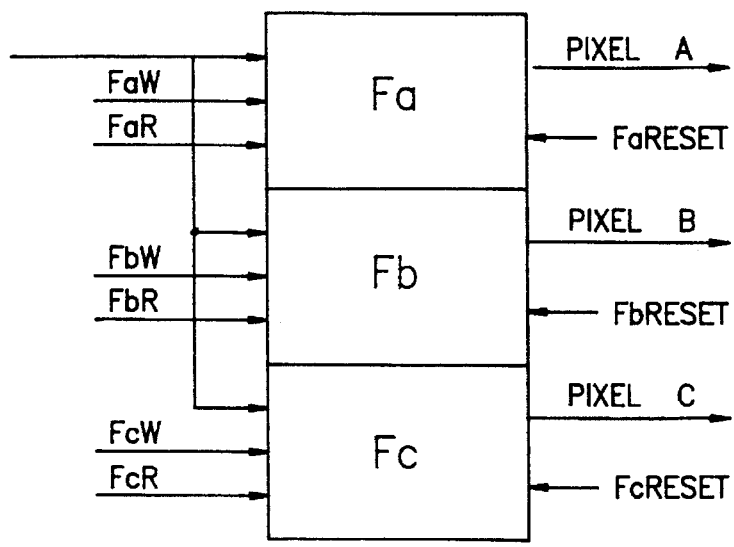
FIG. 3 is a block diagram showing a line store unit of FIG. 2.

The line store unit 20, referring to FIG. 3, includes three FIFO memories, in which each of three FIFO Fa, Fb and Fc memories selects a pixel data of nth even scanning line among output signals of the graphic controller 10 and writes the selected pixel data at the speed of a pixel clock PCLK. In addition, each FIFO stores pixel data corresponding to one scanning line. In addition, the pixel data of the selected scanning line are written into two FIFO memories among the three FIFO memories. Meanwhile, the speed of reading the pixel data from the FIFO of the line store unit 20 is the same as the frequency number of the line clock LCLK. Here, the LCLK is referenced to the pixel clock PLK in the interlace scanning method.

The operation of writing/reading the pixel data into/from the FIFO Fa, Fb and Fc of the store unit 20 is controlled by a control signal outputted from the control signal generator 80, as depicted in FIG. 3. The signals FaW, FbW and FcW are the control signals for writing the pixel data into the FIFO Fa, Fb and Fc, where FaR, FbR, FcR are the control signals for reading the pixel data written on the FIFO Fa, Fb and Fc, and FaREST, FbREST and FcREST are the control signals for resetting the FIFO Fa, Fb and Fc.

Figure 4:
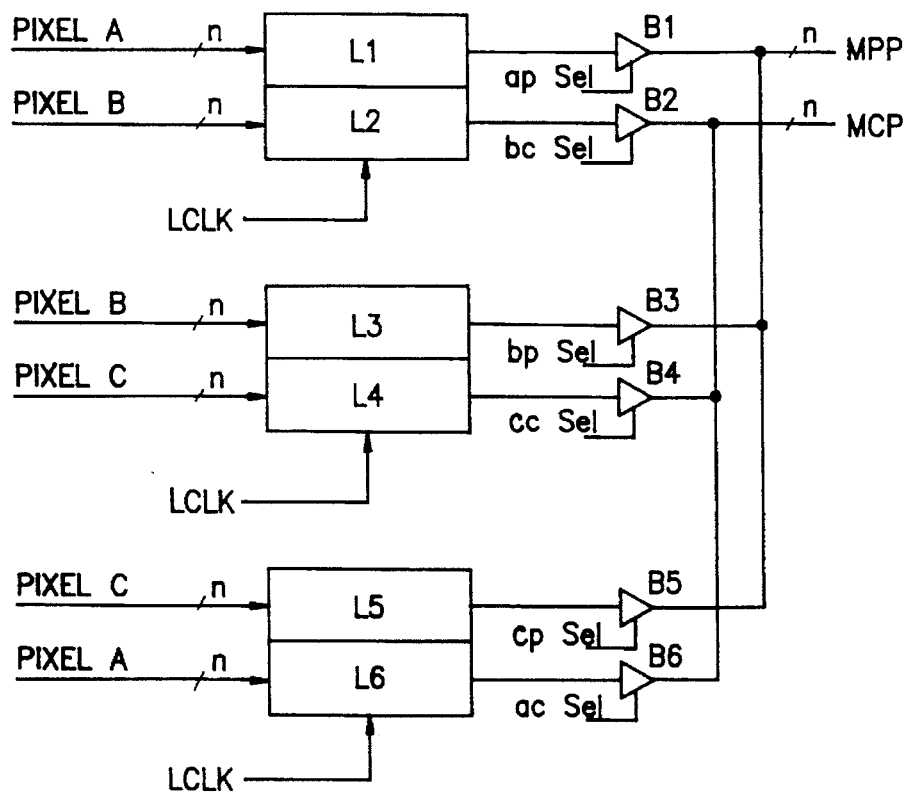
FIG. 4 is a block diagram showing a multiplexer of FIG. 2.

The pixel data PIXEL A, PIXEL B and PIXEL C outputted from the line store unit 20 are inputted to the multiplexer 30. Here, the multiplexer 30, referring to FIG. 4, includes latches L1 to L6 for latching the output signals PIXEL A, PIXEL B and PIXEL C of the FIFO Fa, Fb and Fc and three state buffers B1 to B6 for buffering the output signals of the latches L1 to L6.

When the pixel data PIXEL A, PIXEL B, and PIXEL C outputted from the FIFO Fa, Fb and Fc to the multiplexer 30, the multiplexer 30 selects a pixel data corresponding to two scanning lines. Among the selected two scanning lines, one is the pixel data (MCP: Multiplexed Current Pixel) of the line to be currently scanned and the other is the pixel data of the previously scanned line.

The operation of the line store unit 20 and the multiplexer 30 will now be explained with reference to FIG. 8.

To begin with, the operation of writing/reading the pixel data of the scanning line into/from the FIFO is performed from when the vertical synchronous signal VS is high and (an inactive state) to when the vertical synchronous signal VS is low and (an active state). At this time, referring to FIG. 8B, the operation that the selected nth even pixel data I0 to I6 are written on the FIFO Fa, Fb, and Fc in accordance with a horizontal synchronous signal HS is as follows. The pixel data of the selected first line are written on Fc and Fa as shown in FIG. 8D. Thereafter, the selected second pixel data I1 are written on Fb and Fc. At this time, for writing the pixel data on Fb and Fc, Fb and Fc should be reset before the pixel data I1 are written thereon. Referring to FIG. 8F, such an operation is performed during blank time in which the horizontal synchronous signal HS is low for writing the pixel data I1. The pixel data are written on two FIFO selected among three FIFO Fa, Fb and Fc. FIG. 8 shows the relationship between each of FIFO Fa, Fb and Fc and the pixel data I0 to I6 of the scanning lines written on FIFO Fa, Fb and Fc.

Meanwhile, the operation in which the pixel data in FIFO Fa, Fb and Fc are read is as follows. The pixel data I0 are written into FIFO Fc and Fa, and at the same time, the pixel data in FIFO Fb and Fc are read as shown in FIG. 8E. In addition, when the pixel data I1 are written into Fb and Fc, the pixel data in Fa and Fb are read. In addition, at the same time that the pixel data I1 are written/read into/from fb, the pixel data I0 is read from Fa. As in the same manner, the pixel data in FIFO Fa, Fb and Fc are read. FIG. 8H shows a relationship between each of FIFO Fa, Fb and Fc and the pixel data I0 to I6 of the scanning line read from FIFO Fa, Fb and Fc.

When the pixel data I0 to I6 of the scanning line are outputted from FIFO Fa, Fb and Fc as in FIG. 8E, where the pixel data outputted from FIFO Fa, Fb and Fc is respectively PIXEL A, PIXEL B and PIXEL C, the pixel data PIXEL A and PIXEL B are respectively inputted to the latches L1 and L2 and the pixel data PIXEL B and PIXEL C are respectively inputted to the latches L3 and L4 and the pixel data PIXEL C and PIXEL A are respectively inputted to the latches L5 and L6. The pixel data inputted to the latches L1 to L6 are outputted to the buffers B1 to B6 at the speed of LCLK. The buffers B1 to B6 selectively output the data in accordance with a control signal applied from the control signal generator 80 to the MPP and MCP.

Figure 5:
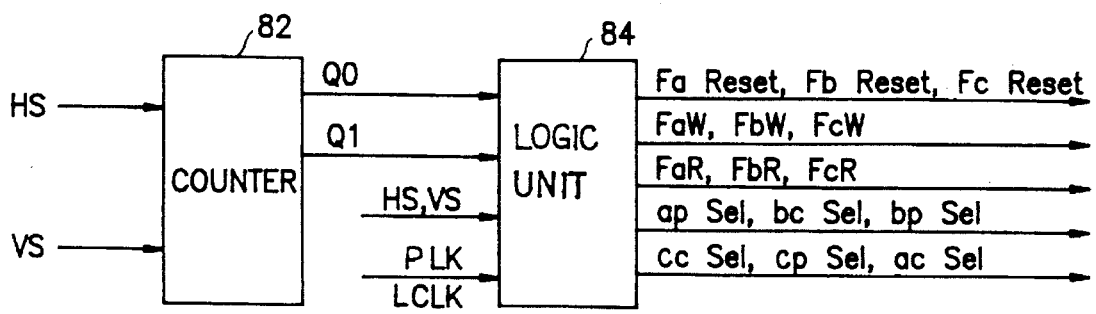
FIG. 5 is a block diagram showing a control signal generator of FIG. 2.
Figure 6:
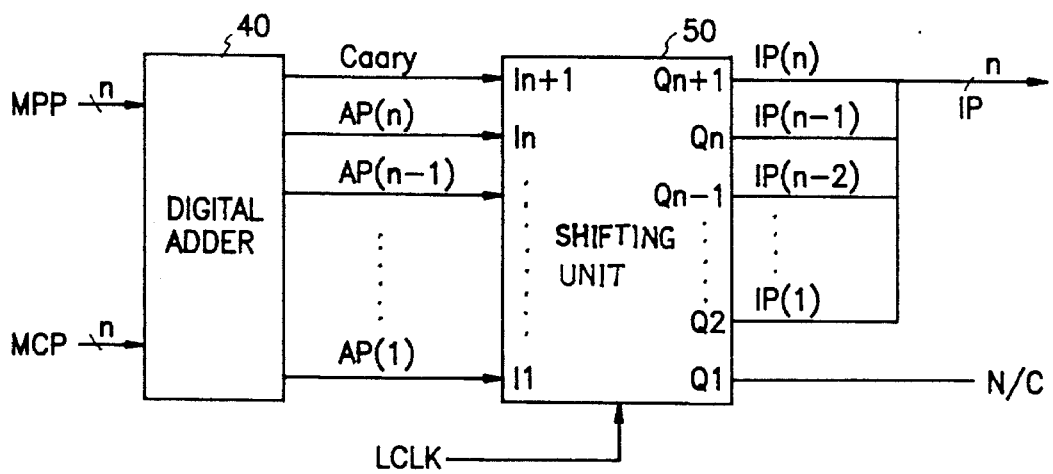
FIG. 6 is a block diagram showing an adder and a shifting unit of FIG. 2.
Figure 7:
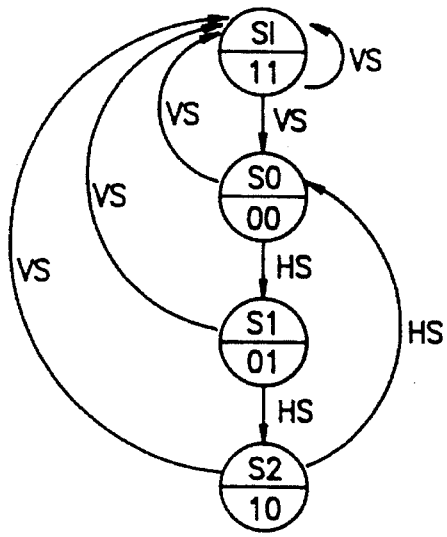
FIG. 7 is a view showing a shifting state of a counter at the control signal generator of FIG. 5.

At this time, the pixel data inputted to each of buffers B1 to B6 are recognized by the value of signals Q0 and Q1 outputted from the counter 82 of the control signal generator 80 as shown in FIG. 5. The counter 82 shown in FIG. 5 is the idle state(SI: count value CNT=11) while the vertical synchronous signal VS is low. When the vertical synchronous signal VS is high, the counter 82 starts counting by receiving a vertical synchronous signal VS and a horizontal synchronous signal HS. The counter 82 is clocked whenever the horizontal synchronous signal HS is increased, so that the state thereof is shifted in an order of S0(00)>S1(01)>S2(10)>S0(00) as shown in FIG. 7. In addition, when the vertical synchronous signal VS is low in each state, the counter 82 returns to the idle state SI 11. FIG. 8C shows the value that the horizontal synchronous signal HS is counted.

Thereafter, the logic unit 84 of the control signal generator 80 receives the output signals Q0 and Q1, the inputted horizontal and vertical synchronous signals HS and VS, and the PCLK and LCLK and outputs the control signals for controlling the buffers B1 to B6 of the multiplexer 30. The signals for controlling the buffers B1 to B6 are as follows:

apSel is the pixel data selection signals of the previous scanning line outputted from Fa;

acSel is the pixel data selection signals of the current scanning line outputted from bpSel is the pixel data selection signals of the previous scanning line outputted from Fb;

bcSel is the pixel data selection signals of the current scanning line outputted from Fb;

cpSel is the pixel data signals of the previous scanning line outputted from Fc; and ccSel is the pixel data selection signals of the current scanning line outputted from Fc;

In accordance with such signals, when the pixel data I0 to I6 outputted the multiplexer 30 as MCP and MPP as shown in FIG. 8I are inputted to the digital adder 40, the digital adder 40 adds the MCP and the MPP and outputs the carry and the AP pixel data (AP: added pixel) of n bit. The output signals of the added pixel data AP are inputted to the shifting unit 50 and becomes n+1 bit with carry and is shifted toward the next lowest bit by one bit, so that the value of the added pixel data is divided by ½. Therefore, the IP pixel data(IP: interlaced pixel) are outputted.

Thus, the MPP and MCP inputted to the digital adder 40 are added to each other and the carry and the pixel data AP(1) to AP(n) of n bit are outputted to the shifting unit 50. Meanwhile, since the operation of dividing binary data by 2 is the same as shifting one bit toward the lower bit, the output signals of the output terminal Q1 of the shifting unit 50 is in the state of N/C(Not Connection) and n bit from Q2 to Qn+1 is selected as the IP pixel data IP(1) to IP(n). The shifting unit 50 has a function of computing the average value between the currently scanning pixel data MCP and the previously scanned pixel data MPP. Thereafter, the digital encoder 60 encodes the output signals IP of the shifting unit 50 and outputs the encoded output signals 1P.

As described above, the present invention is directed to enhancing the display quality by computing the average value of the pixel data of two adjacent scanning lines in the digital data. In addition, the present invention has the advantage of reducing flicker that occurs; when the computer graphic images of non-interlace scanning method are converted to the formats of the NTSC or PAL. In addition, the line store unit according, to the present invention uses general FIFO memories rather than the special memories, so that the manufacturing cost thereof may be decreased.

What is claimed is:

1. An apparatus for reducing flickers of an encoder, comprising:

graphic control means for outputting pixel data corresponding to an analog output from a line scanning unit, and for outputting a pixel clock signal, a horizontal synchronous signal and a vertical synchronous signal;

synchronous signal covering means for converting a pixel clock signal, a non-interlaced horizontal synchronous signal and non-interlaced vertical synchronous signal outputted from the graphic control means to a pixel clock, a horizontal synchronous signal and a vertical synchronous signal of an interlace scanning method;

control signal generating means for outputting a control signal by receiving a pixel clock, a horizontal synchronous signal and a vertical synchronous signal of a interlace scanning method outputted from the synchronous signal converting means;

line store means for selecting pixel data corresponding to nth even scanning line of the pixel data from the graphic control means and for writing/reading the selected pixel data in accordance with a control signal of the control signal generating means;

multiplexing means for selecting and outputting a pixel data pair corresponding to adjacent scanning lines stored in the line store means;

digital addition means for adding pixels from a pixel data pair from the multiplexer;

shift means for computing average value of pixel data at a scanning line adjacent thereto by receiving an output signal of the digital addition means;

encoding means for encoding a signal outputted from the shift means; and oscillating means for transmitting clocking signals to the control signal generator and the shifting unit.

2. The apparatus of claim 1, wherein said line store means includes a plurality of FIFO memories for writing pixel data of the selected scanning line onto at least two memories when writing in accordance with a control signal of the control signal generating means and for reading pixel data from the FIFO memory in which the pixel data of the adjacent scanning line are written when reading in accordance with a control signal of the control signal generating means.

3. The apparatus of claim 1, wherein said multiplexing means includes a plurality of latch pairs for latching pixel data of the adjacent scanning line and further includes a plurality of buffers for buffering/outputting data from the latch pairs in accordance with a control signal outputted from the control signal generating means.

4. The apparatus of claim 1, wherein said control signal generating means includes a counter for counting the horizontal synchronous signal and the vertical synchronous signal from the synchronous converting means; and a logic unit, responsive to the counter, the horizontal and vertical synchronous signals from the synchronous signal converting means and the clocking signals from the oscillator, for outputting a control signal for controlling the line store means and the multiplexing means.

5. The apparatus of claim 4, wherein said counter is enabled for counting when the vertical synchronous signal is in a high state, said counter counting instances of when the horizontal synchronous signal goes to a binary high state and said counter is inactive when the vertical synchronous signal is in a binary low state.

6. An apparatus for digitally reducing flicker associated with an encoder that converts non-interlaced video signals to interlaced video signals, the apparatus receiving interlaced pixel data output from a line scanner and non-interlaced timing signals associated therewith, the apparatus comprising:

input means for receiving the interlaced pixel data;

timing means for converting non-interlaced timing signals to interlaced timing signals;

a memory, operatively connected to the input means and the timing means, for storing pixel data;

a multiplexer, operatively connected to the memory and the timing means, for reading pixels from selected adjacent interlaced scanning lines stored in the memory;

averaging means, operatively connected to the multiplexer and the timing means, for averaging pixels from adjacent scanning lines; and an encoder, operatively connected to the averaging means for encoding the averaged pixels.

7. An apparatus as in claim 6, wherein the memory comprises:

at least three FIFO buffers.

8. An apparatus as in claim 6, wherein the multiplexer comprises:

at least one pair of latches for each interlaced scanning line stored in the memory.

* * * * *